United States Patent [19]

Gottschalk

[11] Patent Number: 4,510,529

[45] Date of Patent: Apr. 9, 1985

[54] ELECTRONIC CINEMA CAMERA

[75] Inventor: Robert E. Gottschalk, Los Angeles, Calif.

[73] Assignee: Panavision, Incorporated, Tarzana, Calif.

[21] Appl. No.: 505,594

[22] Filed: Aug. 19, 1983

Related U.S. Application Data

[63] Continuation of Ser. No. 285,157, Jul. 20, 1981, Pat. No. 4,437,126.

[51] Int. Cl.³ .............................................. H04N 5/30
[52] U.S. Cl. ..................................... 358/224; 358/225
[58] Field of Search ......................... 358/224, 225, 55; 354/224

[56] References Cited

U.S. PATENT DOCUMENTS 2,757,232 7/1956 Goodale .
3,130,267 4/1964 Engler .
3,833,758 9/1974 Ferrari .
3,899,791 8/1975 Kerr .................................. 354/224
4,237,492 12/1980 Roth et al. .
4,330,797 5/1982 Yokokawa et al. .

Primary Examiner—Richard Murray
Attorney, Agent, or Firm—Lyon & Lyon

[57] ABSTRACT

A camera device for electronic cinematography uses the same lens assembly for a television camera and its monitor as is used with a viewfinder eyepiece assembly, so that the scene in the viewfinder eyepiece assembly is the same as that presented to the television camera and depicted on its monitor. The light from the lens assembly may be reflected by a full mirror into only the viewfinder, or through a partial mirror to both the viewfinder and the television camera. The viewfinder and the television monitor are secured together to move as a unit.

5 Claims, 3 Drawing Figures

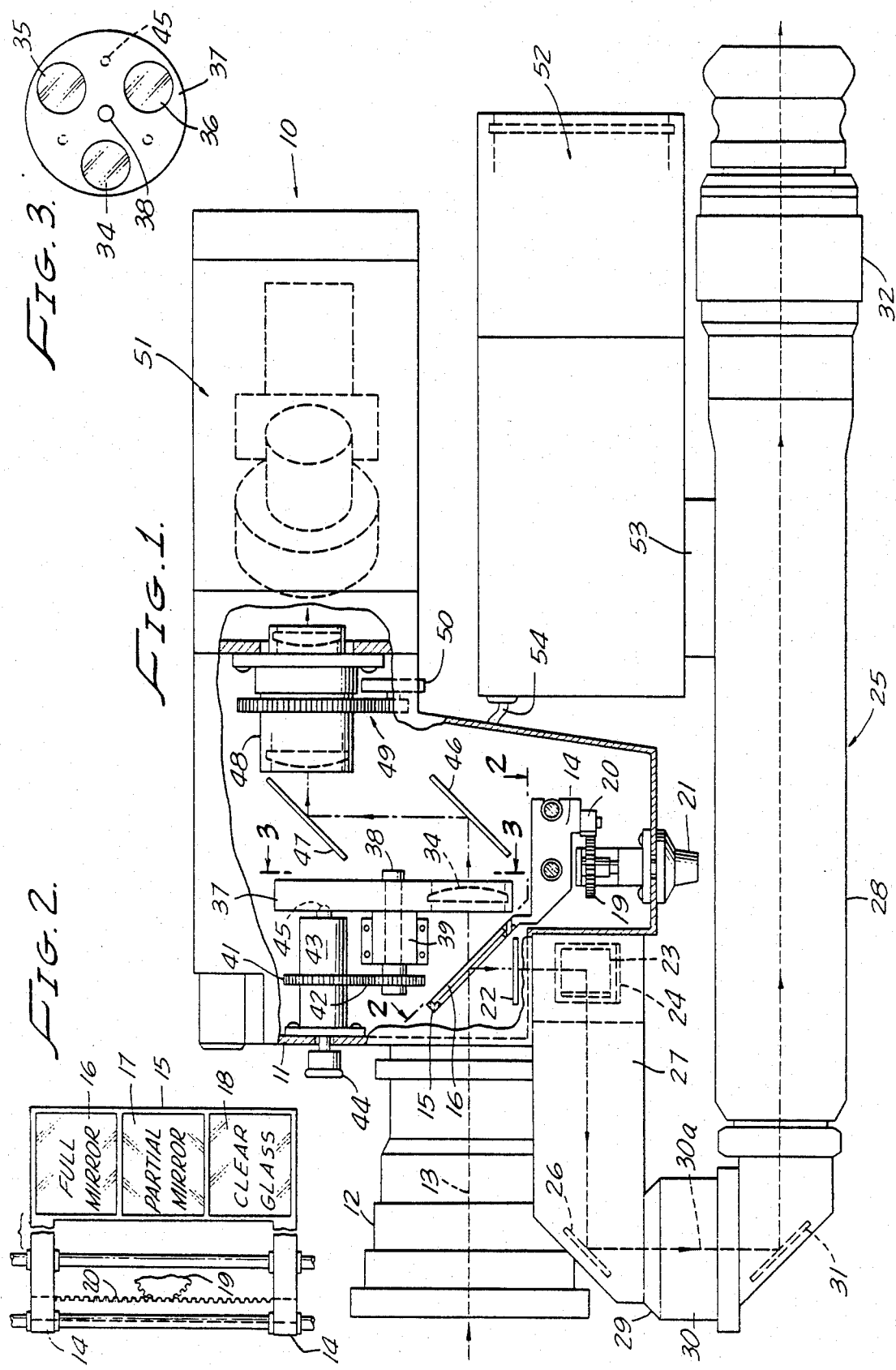

ELECTRONIC CINEMA CAMERA

This is a continuation of application Ser. No. 285,157, filed July 20, 1981, now U.S. Pat. No. 4,437,126.

This invention relates to electronic cinematography and is particularly directed to a camera device having a lens assembly supplying light to a television camera for display on its monitor, the same lens also being used for supplying light to a viewfinder eyepiece assembly. The ground glass provided in the viewfinder eyepiece assembly furnishes a large clear image which is often superior to the image provided by the television monitor. The camera assembly of this invention is particularly adapted for studio use, and for operation by cameramen skilled in operation of motion picture cameras using light-sensitive film advanced frame by frame through the camera. The television monitor which forms part of the assembly is particularly useful for action shots.

Further and more detailed objects and advantages will appear hereinafter.

Referring to the drawings:

FIG. 1 is a plan view partly broken away, showing a preferred embodiment of this invention.

FIG. 2 is a sectional detail taken substantially on the lines 2—2 as shown on FIG. 1.

FIG. 3 is a view taken substantially on the lines 3—3 as shown on FIG. 1.

Referring to the drawings, the television camera assembly generally designated 10 includes a housing 11 and a detachable lens assembly 12 having an optical axis 13. A vertically movable carrier 14 supports a frame 15 which carries a full mirror 16, a partial mirror 17, and clear transparent glass 18, each of which may be brought into alignment with the optical axis 13 by movement of the carrier 14. The transparent glass 18 is of the same thickness as the partial mirror 17, in order to maintain the same light path length of the field lens 34. The full mirror 16, partial mirror 17 and clear glass 18 are carried at an angle of 45° with respect to the optical axis 13. Vertical movement of the carrier 14 is accomplished by means of gear 19 meshing with gear rack 20. A manually accessible knob 21 is mounted outside the housing 11 and serves to turn the gear 19, or the gear may be turned by an electric motor, if desired.

When the full mirror 16 is positioned in alignment with the optical axis 13, light from the lens assembly 12 is reflected through the ground glass 22 and into vertically spaced mirrors in the viewfinder eyepiece assembly generally designated 25. The mirrors 23 and 24 as well as the mirror 26 are mounted in the fixed portion 27 of the viewfinder eyepiece assembly 25. This portion 27 is fixed with respect to the camera housing 11. A movable portion 28 of the viewfinder eyepiece assembly 25 is connected by a rotary joint 29 to the fixed portion 27. A Pechan prism 30 is mounted within the movable joint 29. A mirror 31 is mounted in the movable portion 28 remote from the eyepiece lens 32.

From this description it will be understood that light from the lens assembly 12 is reflected by full mirror 16 to the ground glass 22 and then by mirrors 23, 24, 26, Pechan prism 30, and mirror 31 to the eyepiece lens 32. It will also be understood that the movable portion 28 of the viewfinder eyepiece assembly 25 may be swung about the transverse horizontal axis 30a.

When the partial mirror or pellicle 17 is aligned with the optical axis 13, only a part of the light passes into the viewfinder eyepiece assembly 25, and the remainder of the light passes through one of lenses 34, 35 or 36 carried on the rotary turret 37. Each of the turret lenses 34 is intended for use with a particular lens assembly 12, or range of such lens assemblies. The turret 37 is mounted on a rotary shaft 38 supported in a bearing 39 fixed within the housing 11. The shaft 38 is driven by gears 41 and 42 from a driver 43 turned by a knob 44 accessible exteriorly of the housing 11. The knob 44 also controls a projection 45 received in one of a plurality of indentations in the turret 37, to hold the turret in selected position. If desired, an electric motor may be provided for the driver 43.

Light passing through a turret lens 34 or 35 or 36 is reflected by the fixed mirror 46 mounted at an angle of 45° to the optical axis 13. The light is then reflected from the parallel fixed mirror 47 into a lens assembly 48. A gear drive assembly 49 controls an iris opening for light passing through the lens assembly 48 and into the video camera 51. A manual operator 50 accessible exteriorly of the housing 11 is employed to turn the gear drive assembly 49, although an electric motor may be provided, if desired. The video camera 51 is of conventional construction.

The television monitor generally designated 52 is also of conventional construction but is mounted through connector 53 to move with the movable portion 28 of the viewfinder eyepiece assembly 25. Electrical leads 54 connect the television monitor 52 to the video camera 51 by way of conventional circuitry. The television monitor 52 is physically positioned in the space between the viewfinder eyepiece assembly 25 and the video camera 51, thereby forming a compact assembly.

It will be noted that the television camera 51 and the viewfinder eyepiece assembly 25 both use the same lens assembly 12, so that the monitor 52 and the viewfinder eyepiece assembly 25 both "see" the same scene presented to the television camera 51.

Summarizing, in a first mode of operation all of the light from said objective lens assembly 12 is sent to the optical viewfinder 25. In a second mode, all of the light is sent to the T.V. camera 51. In a third mode, part of the light is sent to the optical viewfinder and part to the T.V. camera.

Having fully described my invention, it is to be understood that I am not to be limited to the details herein set forth but that my invention is of the full scope of the appended claims.

I claim:

1. A camera device for electronic cinematography comprising, in combination: a housing, an objective lens assembly removably mounted on said housing and having an optical axis, a fixed mirror in said housing, a movable turret having a plurality of lenses each movable into alignment with said optical axis to transmit light to said fixed mirror, a television camera, an optical viewfinder assembly, a movable iris device optically interposed between said fixed mirror and said television camera, a television monitor connected to receive electrical impulses derived from said television camera, and multi-mode means for transmitting all light from said objective lens assembly to said optical viewfinder assembly in a first mode, and transmitting all light from said objective lens assembly to said television camera in a second mode.

2. A camera device for electronic cinematography comprising in combination: a housing, an objective lens assembly mounted on said housing, a television camera and an optical viewfinder assembly each supported on said housing and, multi-mode means for transmitting all light from said objective lens assembly to said optical viewfinder assembly in a first mode, and transmitting all light from said objective lens assembly to said television camera in a second mode.

3. A camera device as in claim 2 wherein said multi-mode means additionally operates in a third mode to transmit a portion of said light from said objective lens assembly to said optical viewfinder assembly, and another portion of said light to said television camea.

4. A camera device as in claim 3 wherein said optical viewfinder assembly is supported on said housing for pivotal motion about an axis transverse to said optical axis.

5. A camera device as in claim 4 wherein said optical viewfinder assembly is supported on said housing for pivotal motion about an axis transverse to said optical axis.

* * * * *

UNITED STATES PATENT AND TRADEMARK OFFICE
CERTIFICATE OF CORRECTION

PATENT NO. : 4,510,529
DATED : April 9, 1985
INVENTOR(S) : Robert E. Gottschalk

It is certified that error appears in the above-identified patent and that said Letters Patent is hereby corrected as shown below:

In Column 4, line 2 change "camea" to --camera--.

Signed and Sealed this

Eighth Day of October 1985

[SEAL]

Attest:

DONALD J. QUIGG

Attesting Officer

Commissioner of Patents and
Trademarks—Designate